United States Patent
Park et al.

(10) Patent No.: US 8,092,556 B2
(45) Date of Patent: Jan. 10, 2012

(54) SOLID ELECTROLYTIC CONDENSER AND APPARATUS AND METHOD FOR FORMING INSULATING LAYER OF THE SOLID ELECTROLYTIC CONDENSER

(75) Inventors: Jae Jun Park, Gyeonggi-Do (KR); Hwa Sung Hwang, Gyeonggi-Do (KR); Tae Hun Kang, Gyeonggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 685 days.

(21) Appl. No.: 12/211,449

(22) Filed: Sep. 16, 2008

(65) Prior Publication Data

US 2009/0316338 A1 Dec. 24, 2009

(30) Foreign Application Priority Data

Jun. 18, 2008 (KR) .................. 10-2008-0057337

(51) Int. Cl.
*H01G 9/00* (2006.01)

(52) U.S. Cl. ..................................................... 29/25.03
(58) Field of Classification Search .................. 29/25.03
See application file for complete search history.

(56) References Cited

U.S. PATENT DOCUMENTS

| | | | |
|---|---|---|---|
| 2009/0021894 A1* | 1/2009 | Ning et al. | 361/527 |
| 2009/0169943 A1* | 7/2009 | Kawanishi | 429/30 |

* cited by examiner

*Primary Examiner* — Alexander Ghyka
*Assistant Examiner* — Seahvosh Nikmanesh
(74) *Attorney, Agent, or Firm* — Lowe, Hauptman, Ham & Berner, LLP

(57) ABSTRACT

The present invention provides a solid electrolytic condenser including a condenser element with anode polarity; an anode wire with one side inserted inside the condenser element and the other side projected outside the condenser element; and an insulating layer formed by coating one surface of the condenser element and an exposed region of the anode wire adjacent to the one surface of the condenser element with a liquid insulating material through a non-contact scattering method and an apparatus and a method for forming the insulating layer of the solid electrolytic condenser.

6 Claims, 4 Drawing Sheets

[FIG. 1]
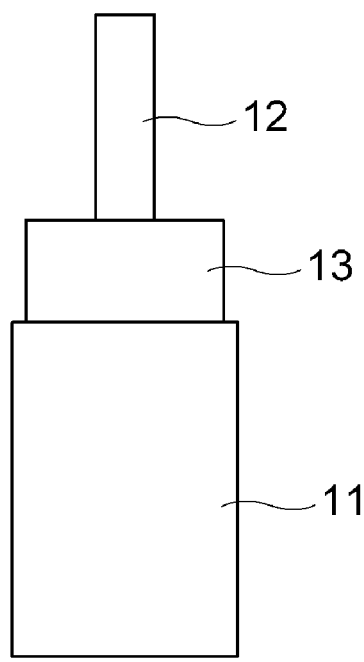
- Prior Art
[FIG. 2]
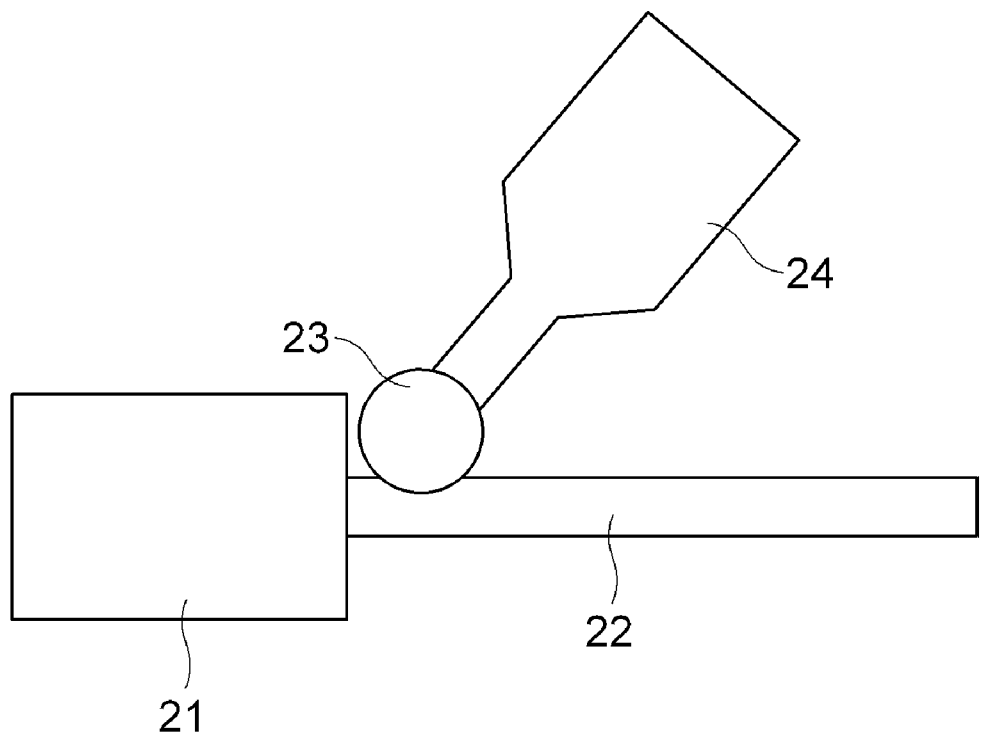
- Prior Art

[FIG. 3]
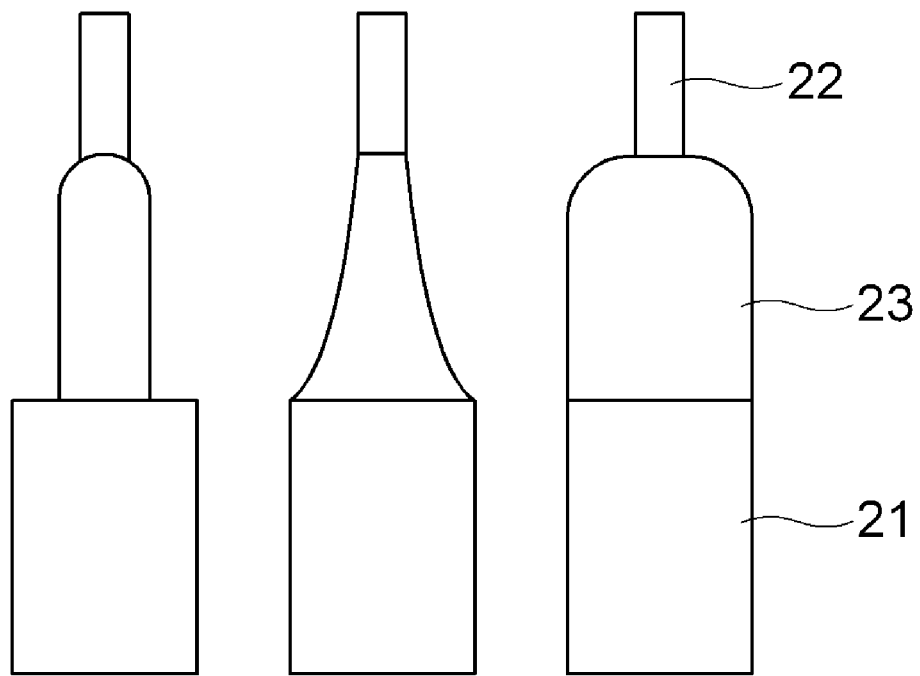
- Prior Art
[FIG. 4]
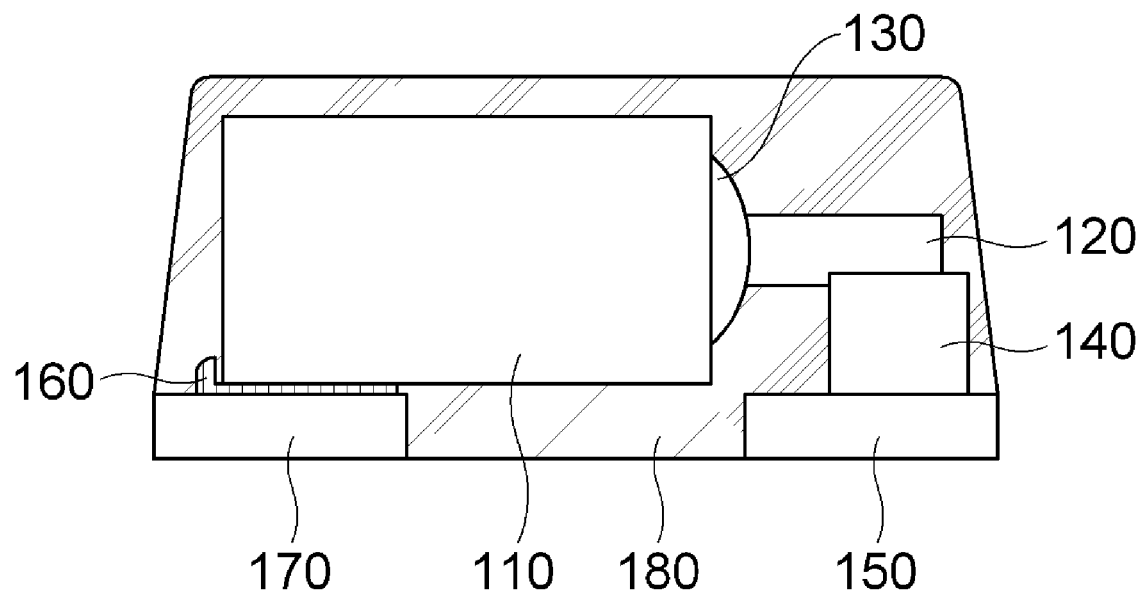

[FIG. 5]
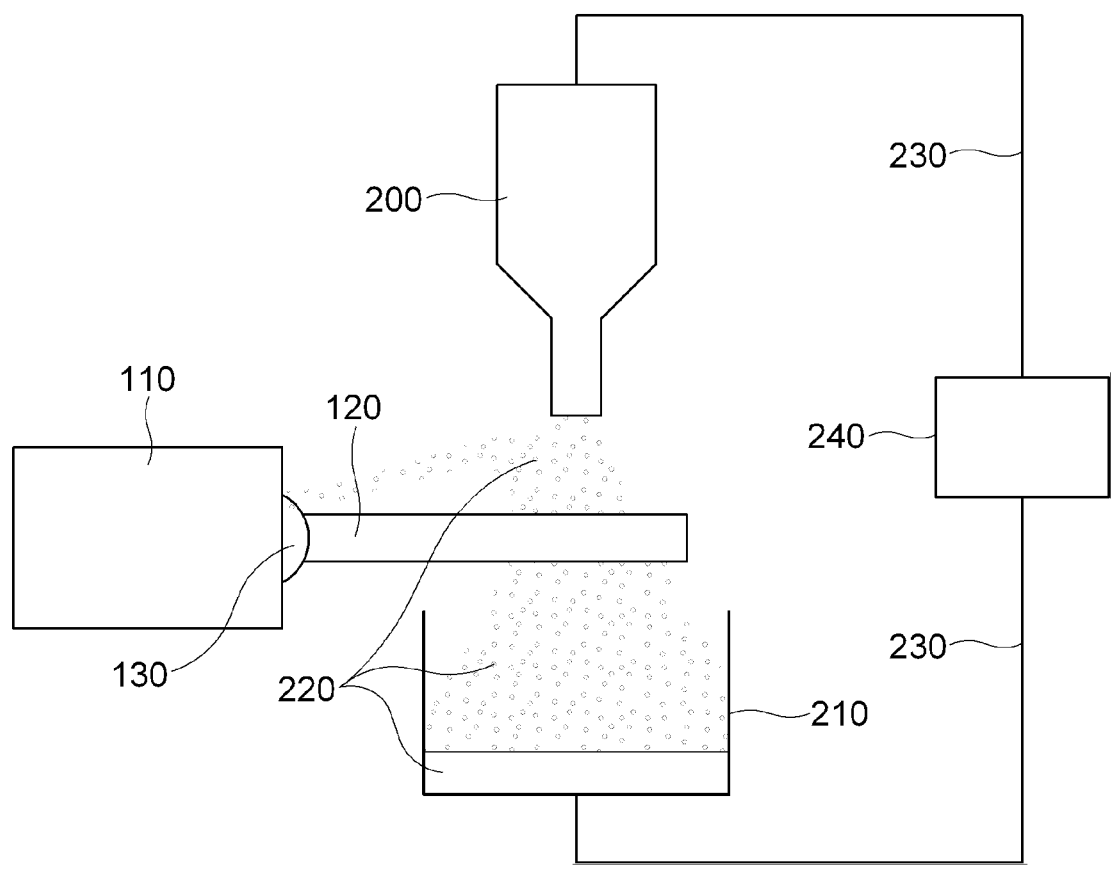
[FIG. 6]
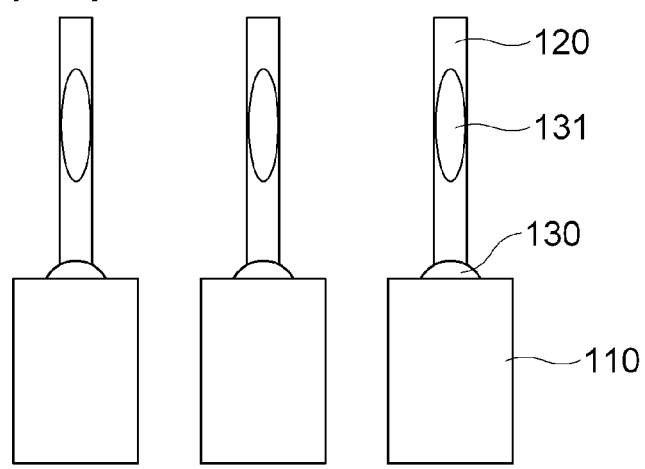

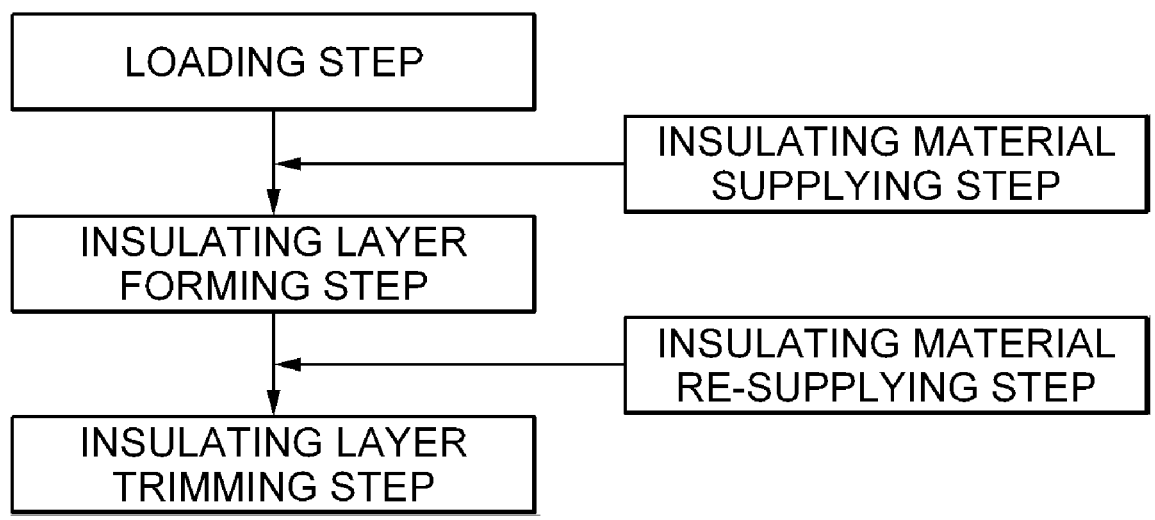
[FIG. 7]

SOLID ELECTROLYTIC CONDENSER AND APPARATUS AND METHOD FOR FORMING INSULATING LAYER OF THE SOLID ELECTROLYTIC CONDENSER

CROSS-REFERENCE TO RELATED APPLICATIONS

This application claims the benefit of Korean Patent Application No. 10-2008-0057337 filed with the Korea Intellectual Property Office on Jun. 18, 2008, the disclosure of which is incorporated herein by reference.

BACKGROUND OF THE INVENTION

1. Field of the Invention

The present invention relates to a solid electrolytic condenser; and, more particularly, to a solid electrolytic condenser with an insulating layer formed in a non-contact scattering method and an apparatus and a method for forming the insulating layer of the solid electrolytic condenser.

2. Description of the Related Art

Generally, solid electrolytic condenser are electronic components utilized for blocking DC current and passing AC current as well as storing electricity. The most representative tantalum condenser of the solid electrolytic condensers is used for an application circuit with a low use range of rated voltage as well as a general industrial instrument. Particularly, it is mainly used to reduce noise of a circuit with a poor frequency characteristic or mobile communication equipment.

The solid electrolytic condenser, as shown in FIG. 1, includes a condenser element 11 made of dielectric powder determining the capacity and characteristic of the condenser, an anode wire (12) inserted and projected into/from the condenser element 11 and a solid plastic insulator 13 surrounding an outer circumferential surface of the anode wire 12 to prevent chemical material generated in a chemical process for forming a cathode layer (not shown) on the surface of the condenser element 11 from spreading to the anode wire.

And, although not shown, an anode lead frame is electrically connected to the anode wire 12 through welding and an anode electrode is mounted at a lower part of the anode lead frame.

Further, a cathode electrode corresponding to the anode electrode is provided at a lower part of the cathode layer formed on the surface of the condenser element 11 by the medium of conductive material and a molding unit is formed to surround the condenser element 11 to protect the aforementioned components.

However, as described above, when the solid plastic insulator 13 is included, the thickness of the insulator 13 is approximately 0.13 mm because of current manufacture technical difficulty and therefore the insulator 13 leads to welding interference in welding the anode wire 12 and the anode lead frame, thereby causing a short circuit and a short or deteriorating bondability of the welding.

Although the welding interference due to the insulator 13 is prevented to some extent when more increasing a projection length of the anode wire 12, a size of the solid electrolytic condenser is increased as much as the increased projection length of the anode wire 12 and a size of the condenser element is reduced as much as the increased size of the solid electrolytic condenser, thereby reducing capacitance.

Meanwhile, as shown in FIG. 2, an insulating layer surrounding an anode wire 22 may be formed by coating a liquid insulating material 23 in a liquid state with contacting a liquid insulating ejector 24 to an anode wire 22 which is inserted and projected into/from one side of a condenser element 21.

However, in such a case, as shown in FIG. 3, likewise, because the liquid insulating material 23 is coated in a state that the liquid insulating material ejector 24 is in contact with the anode wire 22, an insulating layer formed on the anode wire has an uniform shape and a large thickness and therefore it causes welding interference in welding the anode wire 22 and an anode lead frame after forming the insulating layer, thereby causing a short circuit and a short or deteriorating bondability of the welding.

Likewise, although the welding interference is prevented to some extent when increasing a projection length of the anode wire 22, as described above, a size of a solid electrolytic condenser is increased as much as the increased projection length of the anode wire 22 and a size of the condenser element is reduced as much as the increased size of the solid electrolytic condenser, thereby reducing capacitance.

SUMMARY OF THE INVENTION

The present invention has been invented in order to overcome the above-described problems of the conventional solid electrolytic condenser and it is, therefore, an object of the present invention to provide a solid electrolytic condenser capable of improving workability and reducing a manufacturing cost through process simplification, maximizing miniaturization and capacitance and improving welding and preventing a short circuit and a short by preventing welding interference of an insulating layer in welding an anode wire and an anode lead frame by forming the uniform thin film insulating layer through a non-contact scattering method, and an apparatus and a method for forming the insulating layer of the solid electrolytic condenser.

In accordance with one aspect of the present invention to achieve the object, there is provided a solid electrolytic condenser including a condenser element with anode polarity; an anode wire with one side inserted inside the condenser element and the other side projected outside the condenser element; and an insulating layer formed by coating one surface of the condenser element and an exposed region of the anode wire adjacent to the one surface of the condenser element with a liquid insulating material through a non-contact scattering method.

The liquid insulating material is preferably formed by mixing a crude liquid of the insulator and purified water at a ratio of 40:60.

And, the insulating layer is preferably formed to have a thickness of 0.03-0.05 mm from the one surface of the condenser element.

Further, the insulating layer may be trimmed through a laser process.

The solid electrolytic condenser may further include an anode lead frame electrically connected to a lower portion of a projected end of the anode wire through welding; an anode electrode installed at a lower part of the anode lead frame; a conductive material electrically connected to a lower portion of a cathode layer formed on the surface of the condenser element; and a cathode electrode installed at a lower portion of the conductive material.

Meanwhile, in accordance with another aspect of the present invention to achieve the object, there is provided an apparatus for forming an insulating layer of a solid electrolytic condenser including a condenser element with anode polarity and an anode wire with one side inserted inside the condenser element and the other side projected outside the condenser element, wherein the apparatus for forming the insulating layer of the solid electrolytic condenser includes a liquid insulating material ejector separately installed at an upper part of the anode wire; and a liquid insulating material storage vessel separately installed at a lower part of the anode wire to correspond to the liquid insulating material ejector.

Herein, it is preferable that the liquid insulating material ejector is separately installed at the upper part of the anode wire, particularly, installed at a projected end side of the anode wire and ejects a liquid insulating material to the projected end side of the anode wire, and therefore the one surface of the condenser element and the exposed region of the anode wire adjacent to the one surface of the condenser element are coated with the liquid insulating material through the non-contact scattering method to form the insulating layer.

And, the liquid insulating material storage vessel may be formed in a case shape with an opened upper part and receive the liquid insulating material falling to the lower part of the anode wire by being ejected from the liquid insulating material ejector.

The apparatus for forming the solid electrolytic condenser may further include a liquid insulating material circulation channel for re-supplying the liquid insulating material received in the liquid insulating material storage vessel to the liquid insulating material ejector by being installed to connect the liquid insulating material storage vessel and the liquid insulating material ejector.

Further, the apparatus for forming the solid electrolytic condenser may further include a liquid insulating material controller for controlling the flow of the liquid insulating material re-supplied to the liquid insulating material ejector from the liquid insulating material storage vessel by being installed on the circulation channel.

And, the apparatus for forming the solid electrolytic condenser may further include a liquid insulating material supplier for supplying the liquid insulating material to the liquid insulating material ejector by being connected to the liquid insulating material ejector.

Meanwhile, in accordance with still another aspect of the present invention to achieve the object, there is provided a method for forming an insulating layer of a solid electrolytic condenser including the steps of: a loading step to install the solid electrolytic condenser so that an anode wire is positioned between a liquid insulating material ejector and a liquid insulating material storage vessel; and an insulating layer forming step to form the insulating layer on one surface of a condenser element of the solid electrolytic condenser and an exposed region of the anode wire adjacent to the one surface of the condenser element through a non-contact scattering method by ejecting a liquid insulating material from the liquid insulating material ejector toward the liquid insulating material storage vessel.

Herein, in the loading step, a projected end of the anode wire of the solid electrolytic condenser is positioned at an ejection port of the liquid insulating material ejector.

And, in the insulating layer forming step, the insulating layer is formed by scattering the liquid insulating material ejected from the liquid insulating material ejector and coating the one surface of the condenser element of the solid electrolytic condenser and the exposed region of the anode wire adjacent to the one surface of the condenser element with the scattered liquid insulating material.

The method for forming the insulating layer of the solid electrolytic condenser may further include an insulating layer trimming step to trim the insulating layer through a laser process after the insulating layer forming step.

And, the method for forming the insulating layer of the solid electrolytic condenser may further include an insulator re-supplying step to re-supply the liquid insulating material received in the liquid insulating material storage vessel to the liquid insulating material ejector after the insulating layer forming step.

Further, the method for forming the insulating layer of the solid electrolytic condenser may further include an insulator supplying step to supply the liquid insulating material to the liquid insulating material ejector after the loading step.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic construction showing a conventional solid electrolytic condenser with an insulating layer formed with plastic insulator in a solid state;

FIG. 2 is a schematic construction showing a process for forming an insulating layer of a solid electrolytic condenser by a conventional liquid insulating material ejector;

FIG. 3 is a schematic construction showing shapes of the insulating layers formed on an anode wire through the process in FIG. 2;

FIG. 4 is a schematic construction showing a solid electrolytic condenser in accordance with one embodiment of the present invention;

FIG. 5 is a schematic construction showing an apparatus for forming an insulating layer of a solid electrolytic condenser in accordance with one embodiment of the present invention;

FIG. 6 is a schematic construction showing a part of the solid electrolytic condenser with the insulator layer formed by the apparatus for forming the insulating layer in FIG. 5; and FIG. 7 is a view sequentially showing a method for forming an insulating layer of a solid electrolytic condenser in accordance with one embodiment of the present invention.

DETAILED DESCRIPTION OF THE PREFERABLE EMBODIMENTS

Hereinafter, preferable embodiments for a solid electrolytic condenser and an apparatus and a method for forming an insulating layer of the solid electrolytic condenser in accordance with of the present invention will be described in detail with reference to the accompanying drawings.

FIG. 4 is a schematic construction showing a solid electrolytic condenser in accordance with one embodiment of the present invention, FIG. 5 is a schematic construction showing an apparatus for forming a solid electrolytic condenser in accordance with one embodiment of the present invention, FIG. 6 is a schematic construction showing a part of the solid electrolytic condenser with the insulator layer formed by the apparatus for forming the insulating layer in FIG. 5 and FIG. 7 is a view sequentially showing a method for forming an insulating layer of a solid electrolytic condenser in accordance with one embodiment of the present invention.

One Embodiment of a Solid Electrolytic Condenser

First of all, a solid electrolytic condenser in accordance with one embodiment of the present invention will be described in detail with reference to the accompanying drawing.

As shown in FIG. 4, in accordance with one embodiment of the present invention, the solid electrolytic condenser mainly includes a condenser element 110 with anode polarity; an anode wire 120 with one side inserted inside the condenser element 110 and the other side projected outside the condenser element 110; and an insulating layer 130 formed by coating one surface of the condenser element 110 and an exposed region of the anode wire 120 adjacent to the one surface of the condenser element 110 with a liquid insulating material through a non-contact scattering method.

And, the solid electrolytic condenser may further include an anode lead frame 140 electrically connected to a lower portion of a projected end of the anode wire 120 through welding; an anode electrode 150 installed at a lower part of the anode lead frame 140; a conductive material 160 electrically connected to a lower portion of a cathode layer (not shown) formed on the surface of the condenser element 110; a cathode electrode 170 installed at a lower portion of the conductive material 160, and a molding unit 180 surrounding the condenser element 110 to protect the components.

Herein, the insulating layer 130 formed on the one surface of the condenser element 110 and the exposed region of the anode wire 120 adjacent to the one surface of the condenser element 110 is formed by coating with the liquid insulating material through the non-contact scattering method, wherein the liquid insulating material is preferably formed by mixing a crude liquid of the insulator and purified water at a ratio of 40:60 to maximize scattering and coating properties.

And, because the insulating layer 130 is formed by coating with the liquid insulation through the non-contact scattering method, it can be formed in a thin film shape with a small thickness from the one surface of the condenser element 110, preferably, it is formed to have a thickness of 0.03~0.05 mm.

Meanwhile, because the insulation layer 130 is formed through the non-contact scattering method, it may be trimmed through a laser process to remove the liquid insulating material which is coated on a region of the anode wire 120 without requiring the insulating layer when scattering the liquid insulating material.

One Embodiment of an Apparatus for Forming an Insulating Layer of a Solid Electrolytic Condenser Then, an apparatus for forming an insulating layer of the solid electrolytic condenser in accordance with one embodiment of the present invention will be described in detail with reference to the accompanying drawings.

As shown in FIG. 5, in accordance with the one embodiment of the present invention, the apparatus for forming the insulating layer of the solid electrolytic condenser mainly includes a liquid insulating material ejector 200 separately installed at an upper part of the anode wire 120 inserted and projected into/from the condenser element 110 of the solid electrolytic condenser; and a liquid insulating material storage vessel 210 separately installed at a lower part of the anode wire 120 to correspond to the liquid insulating material ejector 200.

Herein, it is preferable that the liquid insulating material ejector 200 is separately installed at the upper part of the anode wire 120, particularly, installed at a projected end side of the anode wire 120 and ejects a liquid insulating material 220 to the projected end side of the anode wire 120, and therefore the one surface of the condenser element 110 and the exposed region of the anode wire 120 adjacent to the one surface of the condenser element are coated with the liquid insulating material 220 through the non-contact scattering method to form the insulating layer 130.

And, the liquid insulating material storage vessel 210 is formed in a case shape with an opened upper part and receives the liquid insulating material 220 falling to a lower part of the anode wire 120 by being ejected from the liquid insulating material ejector 200.

That is, some of the liquid insulating material 220 ejected from the liquid insulating material ejector 200 installed in a non-contact type to the anode wire 120 to the projected end side of the anode wire 120 is coated on the one surface of the condenser element 110 and a part of an outer circumferential surface of the anode wire 120 adjacent to the one surface of the condenser element 110 through agglomeration such as a capillary phenomenon in which a portion of the liquid insulating material is agglomerated to a region with a large area to form the insulating layer 130 and the remaining liquid insulating material 220 which is not scattered and falls to the lower part of the anode wire 120 is received and stored in the liquid insulating material storage vessel 210.

In result, it is possible to improve workability and reduce a manufacturing cost through process simplification, maximize miniaturization and capacitance, and improve welding and prevent a short circuit and a short by preventing welding interference of the insulating layer 130 in welding the anode wire 120 and the anode lead frame by forming the uniform thin film insulating layer as shown in FIG. 6 by forming the insulating layer 130 through the non-contact scattering method.

Meanwhile, the apparatus for forming the solid electrolytic condenser may further include a liquid insulating material circulation channel 230 for re-supplying the liquid insulating material 220 received in the liquid insulating material storage vessel 210 to the liquid insulating material ejector 200 by being installed to connect the liquid insulating material storage vessel 210 and the liquid insulating material ejector 200.

That is, it is possible to reuse the remaining liquid insulating material 220 after forming the insulating layer 130 through scattering by diluting the liquid insulating material 220 received in the liquid insulating material storage vessel 210 again and then re-supplying it to the liquid insulating material ejector 200 through the circulation channel 230.

At this time, it is possible to control the flow of the liquid insulating material 220 re-supplied from the liquid insulating material storage vessel 210 to the liquid insulating material ejector 200 by installing a liquid insulating material controller 240 on the circulation channel 230.

That is, the liquid insulating material controller 240 re-supplies or blocks the liquid insulating material 220 from the liquid insulating material storage vessel 210 to the liquid insulating material ejector 200.

Meanwhile, although not shown, the apparatus for forming the insulating layer of the solid electrolytic condenser may further include a liquid insulating material supplier for supplying the liquid insulating material 220 to the liquid insulating material ejector 200 by being connected to the liquid insulating material ejector 200.

That is, although a worker may additionally supply the liquid insulating material 220 to the liquid insulating material ejector 200 by directly observing it when the liquid insulating material 220 in the liquid insulating material ejector 200 reduces less than a set value, the liquid insulating material supplier may be installed and also automatically supply the liquid insulating material 220 to the liquid insulating material ejector 200 according to the capacity of the liquid insulating material 220 received in the liquid insulating material ejector 200.

One Embodiment of a Method for Forming an Insulating Layer of a Solid Electrolytic Condenser Then, a method for forming an insulating layer of a solid electrolytic condenser in accordance with one embodiment of the present invention will be described in detail with reference to the accompanying drawing.

As shown in FIG. 7, in accordance with the one embodiment of the present invention, the method for forming the insulating layer of the solid electrolytic condenser mainly includes a loading step to install the solid electrolytic condenser so that an anode wire (120: referring to FIG. 5) is positioned between a liquid insulating material ejector (200: referring to FIG. 5) and a liquid insulating material storage vessel (210: referring to FIG. 5); and an insulating layer forming step to form the insulating layer (130: referring to FIG. 5) on one surface of a condenser element (110: referring to FIG. 5) of the solid electrolytic condenser and an exposed region of the anode wire 120 adjacent to the one surface of the condenser element 110 through a non-contact scattering method by ejecting liquid insulating material (220: referring to FIG. 5) from the liquid insulating material ejector 200 toward the liquid insulating material storage vessel 210.

Herein, in the loading step, a projected end of the anode wire 120 of the solid electrolytic condenser is positioned at an ejection port of the liquid insulating material ejector 200.

And, in the insulating layer forming step, the insulating layer 130 is formed by scattering the liquid insulating material 220 ejected from the liquid insulating material ejector 210 and then coating the one surface of the condenser element 110 of the solid electrolytic condenser and the exposed region of the anode wire 120 adjacent to the one surface of the condenser element 110.

That is, the insulating layer 130 is always uniformly formed in a thin film type because the liquid insulating material ejector 200 ejects the liquid insulating material 220 to a projected end side of the anode wire 120 in a state of being separated from the anode wire 120 not to be contacted and therefore the liquid insulating material 220 ejected through the liquid insulating material ejector 200 is scattered in a non-contact state to the condenser element 110 and the anode wire 120 and coated on the one surface of the condenser element 110 and a part of an outer circumferential surface of the anode wire 120 adjacent to the one surface of the condenser element 110.

Meanwhile, the method for forming the insulating layer of the solid electrolytic condenser may further include an insulating layer trimming step to trim the insulating layer 130 through a laser process after the insulating layer forming step.

That is, because the insulating layer 130 is formed by coating the liquid insulating material 220 in the non-contact scattering method, it may be trimmed by removing the unnecessary liquid insulating material through a laser process for removing the liquid insulating material which is coated on a region of the anode wire 120 without requiring the insulating layer when scattering the liquid insulating material 220.

Meanwhile, the method for forming the insulating layer of the solid electrolytic condenser may further include an insulator re-supplying step to re-supply the liquid insulating material 220 received in the liquid insulating material storage vessel 210 to the liquid insulating material ejector 200 after the insulating layer forming step.

That is, it is possible to reuse the remaining liquid insulating material 220, after forming the insulating layer 130 through scattering, by diluting the liquid insulating material 220 received in the liquid insulating material storage vessel 210 again and then re-supplying it to the liquid insulating material ejector 200 through the circulation channel (230: referring to FIG. 5) and the liquid insulating material controller (240: referring to FIG. 5).

And, the method for forming the insulating layer of the solid electrolytic condenser may further include an insulator supplying step to supply the liquid insulating material 220 to the liquid insulating material ejector 200 after the loading step.

That is, a worker may additionally supply the liquid insulating material 220 to the liquid insulating material ejector 200 by directly observing it when the liquid insulating material 220 in the liquid insulating material ejector 200 reduces less than a set value or the liquid insulating material supplier also may be installed and automatically supply the liquid insulating material 200 to the liquid insulating material ejector 200 according to the capacity of the liquid insulating material 220 received in the liquid insulating material ejector 200.

As described above, in accordance with the present invention, the solid electrolytic condenser and the apparatus and method for forming the insulating layer of the solid electrolytic condenser have advantages of improving workability and reducing a manufacturing cost through process simplification, maximizing miniaturization and capacitance, and improving welding and preventing the short circuit and the short by preventing the welding interference of the insulating layer in welding the anode wire and the anode lead frame by forming the uniform thin film insulating layer through the non-contact scattering method.

As described above, although the preferable embodiments of the present invention have been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. A method for forming an insulating layer of a solid electrolytic condenser comprising the steps of:
a loading step to install the solid electrolytic condenser so that an anode wire is positioned between a liquid insulating material ejector and a liquid insulating material storage vessel; and
an insulating layer forming step to form the insulating layer on one surface of a condenser element of the solid electrolytic condenser and an exposed region of the anode wire adjacent to the one surface of the condenser element through a non-contact scattering method by ejecting a liquid insulating material from the liquid insulating material ejector toward the liquid insulating material storage vessel.

2. The method according to claim 1, wherein in the loading step, a projected end of the anode wire of the solid electrolytic condenser is positioned at an ejection port of the liquid insulating material ejector.

3. The method according to claim 1, wherein in the insulating layer forming step, the insulating layer is formed by scattering the liquid insulating material ejected from the liquid insulating material ejector and coating the one surface of the condenser element of the solid electrolytic condenser and the exposed region of the anode wire adjacent to the one surface of the condenser element with the scattered liquid insulating material.

4. The method according to claim 1, further comprising an insulating layer trimming step to trim the insulating layer through a laser process after the insulating layer forming step.

5. The method according to claim 1, further comprising an insulator re-supplying step to re-supply the liquid insulating material received in the liquid insulating material storage vessel to the liquid insulating material ejector after the insulating layer forming step.

6. The method according to claim 1, further comprising an insulator supplying step to supply the liquid insulating material to the liquid insulating material ejector after the loading step.

* * * * *